3,047,355
PROCESS FOR TREATING TEXTILE
MATERIALS
Hanswilli von Brachel, Koln-Sulz, Georg von Finck, Leverkusen, and Werner Langmann, Koln-Mulheim, Germany, assignors to Farbenfabriken Bayer Aktiengesellschaft, Leverkusen, Germany, a corporation of Germany
No Drawing. Filed Apr. 21, 1959, Ser. No. 807,756
Claims priority, application Germany Apr. 24, 1958
2 Claims. (Cl. 8—115.5)

The present invention relates to the treatment of textile materials; more particularly it concerns a process for treating textile materials which consists in that polyalkylene ethers containing at least two active methylol groups and/or at least two groups which are capable of reacting with formaldehyde or compounds splitting off formaldehyde or containing active methylol groups, are cross-linked on the textile materials either by condensation with themselves or with formaldehyde or with compounds splitting off formaldehyde or containing at least two active methylol groups. Active methylol groups defined by the present invention are methylol groups which are linked to nitrogen or to nuclei of phenols and which are either free or etherified by low molecular weight aliphatic alcohols such as e.g. methyl alcohol. It is self-evident that at least some of the reaction components must contain three or more groupings capable of being cross-linked, in order to render the cross-linking or curing possible.

Suitable polyalkylene ethers which contain at least two active methylol groups and which are cross-linked on the textile materials by condensation with themselves are for instance the uncured reaction products of water-soluble hydroxyalkylated polyvalent alcohols with di-methylol urea or hexamethylolmelamine.

Suitable polyalkylene ethers capable of reacting with formaldehyde or compounds splitting off formaldehyde or containing active methylol groups are, for example, the reaction products of ethylene oxide or propylene oxide with phenols, more especially polyvalent phenols such as resorcinol or hydroquinone, with aromatic hydroxycarboxylic acids such as salicylic acid, or with aromatic amines such as aniline or xylidine; preferred products are those which are obtained by reacting said reaction products with polyfunctional compounds which may serve for combining compounds containing hydroxyl groups, for example, with di- or polyisocyanates, di- or polycarboxylic acids, di- or polyvinyl sulfones, polyepoxides or di-hydroxyalkyl sulfides such as thiodiglycol. Suitable polyalkylene ethers capable of reacting with formaldehyde or compounds splitting off formaldehyde or containing active methylol groups are also those which are obtainable by reacting high molecular weight alkylene oxides such as e.g. butylene oxide, cyclohexene oxide, styrene oxide, trimethylene oxide or tetrahydrofuran, their polymers or the copolymers of such alkylene oxides and ethylene oxide or propylene oxide with substances which are capable of reacting with formaldehyde or compounds splitting off formaldehyde or containing active methylol groups. Substances of this type include, for example, phenols, especially polyvalent phenols, aromatic amines, carboxylic acid amides, ureas, urethanes, guanidine, melamine, phenylglycide ether as well as the methylol compounds of ureas, urethanes, guanidine or melamine.

As compounds splitting off formaldehyde or compounds containing active methylol groups with which the polyalkylene ethers are possibly condensed on the textile materials, the following may be mentioned: trioxane, paraformaldehyde, hexamethylene-tetramine as well as formaldehyde acetals, condensation products of formaldehyde with urea and/or guanidine or melamine, for example dimethylol urea and tri- or hexamethylolmelamine, N,N'-dimethylol-alkylen- or -arylene-dicarboxylic acid diamides, tetramethylol-hydrazo-dicarboxylic acid diamide and dimethylol-p-cresol.

The polyalkylene ethers which are soluble in water are advantageously used in aqueous solution; the water-insoluble polyethers may be used in the form of solutions in organic solvents or in the form of aqueous dispersions with the aid of emulsifying or dispersing agents.

The cross-linking of the polyalkylene ethers with themselves or with formaldehyde, or with compounds splitting off formaldehyde or containing active methylol groups, is expediently carried out in such a manner that the textile materials treated with the polyethers, preferably in the presence of catalysts, e.g. in the presence of formic acid, oxalic acid, ammonium sulfonate or zinc chloride, are allowed to stand at room temperature for some time or are heated for a brief period. In addition to cross-linking of the polyethers also combining with the fibrous material may occur.

The textile materials treated according to the process of the invention possess valuable properties, they have above all an outstanding antistatic finish; it is remarkable that this antistatic finish is surprisingly fast to washing with soaps or synthetic detergents in aqueous baths, and to cleaning with organic solvents such as benzine or carbon tetrachloride. Dyed textile materials are in general not altered in shade and not affected as to their fastness properties.

The polyethers suitable for the process according to the present invention may also contain in addition to the aforesaid reactive groups atoms or atom groupings which further improve the properties of the treated textile materials; thus, for example, ammonium, sulfonium, carboxyl and/or hydroxyl groups are capable of improving the antistatic effect, whilst high molecular weight alkyl radicals influence the solubility in the various media, and radicals of polyhydric alcohols increase the cross-link ability of the products due to the branching thus brought about.

If desired, the process according to the invention may also be carried out with the aid of other textile finishing agents, for example those capable of improving the handle of the material.

The following examples serve to illustrate the invention without, however, limiting the scope thereof. The parts given are by weight.

*Example 1*

A fabric of acetate rayon or polyacrylonitrile or polyamide fibres is treated on the padding machine at room temperature with an aqueous liquor containing per litre 50 g. of the polyether described below, 20 g. of dimethylol urea and 5 g. of oxalic acid. The fabric is subsequently dried at 130° C. for 10 minutes. The fabric thus treated has an antistatic finish fast to light and washing.

The polyether used was prepared in the following manner: 200 parts of hydroxyethylated resorcinol of molecular weight 905 were heated to 180° C. for 4 hours with 40 parts of thiodiglycol and 2 parts of ortho-phosphoric acid according to the process of copending application Serial No. 753,215, filed August 5, 1958, in the name of Hanswilli von Brachel and Hans Holtschmidt. The reaction product was kept at 180° C. in a vacuum until a polyether of molecular weight 4000 was formed with further splitting off of water.

*Example 2*

A fabric of polyacrylonitrile, polyamide or polyester fibres is treated on the padding machine at room temperature with an aqueous liquor containing per litre 35 g. of the polyether described below, 15 g. of trimethylolmelamine, 10 g. of ammonium chloride, 2 g. of formic acid and 15 g. of sodium oleyl sulfate as solubilizing agent.

The fabric is then dried and heated to 110° C. for a further 20 minutes. The antistatic finish thus obtained is very fast to washing.

The polyether used was prepared in the following manner: 181 parts of hydroxyethylated resorcinol of molecular weight 910 were treated at 120° C. with 23.5 parts by weight of hexanediisocyanate with the addition of 1 to 2 parts by weight of benzoyl chloride and kept at this temperature for 3 hours.

*Example 3*

A fabric of polyacrylonitrile fibres is treated on the padding machine at room temperature with an aqueous liquor containing per litre 30 g. of the polyether described below, 100 g. of 30% formaldehyde, 5 g. of oxalic acid and 20 g. of oleyl sulfate. The fabric is then dried and heated at 120° C. for a further 10 minutes. The antistatic finish thus obtained is very fast to washing.

The polyether used was prepared according to the method indicated for the production of the polyether in Example 1, from 222 parts of hydroxyethylated resorcinol of molecular weight 660 and 75 parts by weight of thiodiglycol in the presence of 3 parts of ortho-phosphoric acid.

*Example 4*

Yarn of polyamide is treated at room temperature for 3 minutes with an aqueous liquor containing per litre 35 g. of a polyalkylene polyether containing sulfonium groups and described below, 30 g. of dimethylol urea, 10 g. of ammonium chloride and 2 g. of formic acid. After centrifuging and drying, the yarn is heated to 130° C. for a further 20 minutes. The yarn thus treated has an excellent antistatic finish.

The aforesaid polyether containing sulfonium groups was prepared in the following manner: 222 parts of hydroxyethylated resorcinol of molecular weight 600 and 120 parts of thiodiglycol were condensed in the presence of 3 parts of ortho-phosphoric acid according to the method indicated for the production of the polyether in Example 1 until the reaction product had a molecular weight of 1750. 240 parts of the polyether-thioether thus obtained were heated to 90° C. for 1 hour with 60 parts by weight of dimethyl sulfate with the addition of a little sodium carbonate.

*Example 5*

A fabric of synthetic fibres, e.g. polyacrylonitrile, polyamide or polyester fibres, is treated on the padding machine at room temperature with an aqueous liquor containing per litre 20 g. of the polyether described below, 5 g. of a condensation product of triethylene glycol and dimethylol urea (prepared by distilling off in vacuo at 60–80° C. 7 litres of water from a solution (pH 4) of 3000 g. of triethylene glycol and 2680 g. of dimethylol urea in 10 litres of water), 3 g. of ammonium sulfate and 2 g. of the sodium salt of dibutylnaphthalenesulfonic acid or paraffin sulfonic acid. Subsequently the fabric is dried and heated to 120° for 10 minutes. The antistatic finish thus obtained is very fast to washing.

The polyether used was prepared in the following manner: 200 parts of hydroxyethylated resorcinol of molecular weight 1100 were heated with 40 parts of thiodiglycol and 2 parts of ortho-phosphoric acid in the same manner as described in Example 1 until a polyether of molecular weight 5000 was formed.

An antistatic finish which is likewise very fast to washing can also be obtained if the fabric is treated with an aqueous liquor containing per litre instead of 5 g. of the condensation product of triethylene glycol and dimethylol urea one of the following products:

(a) 7.5 g. of a condensation product of octaethylene glycol and dimethylol urea prepared by distilling off in vacuo at 60–80° C. 4 litres of water from a solution (pH 4) of 14700 g. of octaethylene glycol and 5500 g. of dimethylol urea in 8 litres of water;

(b) 7.5 g. of a condensation product of octaethylene glycol and trimethylolmelamine prepared by heating 185 g. of octaethylene glycol and 216 g. of trimethylolmelamine in vacuo to 60–80° in the presence of p-toluene sulfonic acid;

(c) 5 g. of the dimethylol derivative of ethylene urea or the dimethyl ether thereof;

(d) 3 g. of the tetramethyl ether of tetramethylolhydrazodicarboxylic acid diamide.

*Example 6*

A fabric of polyacrylonitrile is treated on the padding machine at room temperature with an aqueous liquor containing per litre 25 g. of the polyether described below, 10 g. of the tetramethyl ether of tetramethylol-hydrazodicarboxylic acid diamide and 3 g. of ammonium sulfate or ammonium chloride, the pH of the liquor being adjusted to 4.5 by means of 10% sulfuric acid. Subsequently the fabric is dried and heated to 130° C. for 12 minutes. An antistatic finish is obtained which is very fast to washing.

The polyether used was prepared in the following manner: 40 parts of hexane diisocyanate were added to a mixture of 157 parts of hydroxyethylated stearyl amine of molecular weight 1250, 135 parts of hydroxyethylated resorcinol of molecular weight 1100 and 3 parts of benzoyl chloride at 120° C. in the course of an hour and the reaction mixture was kept at this temperature for a further four hours.

*Example 7*

A fabric of polyacrylonitrile or polyamide is treated on the padding machine at room temperature with an aqueous liquor containing per litre 30 g. of the polyether prepared from hydroxyethylated resorcinol and thiodiglycol according to Example 5, 10 g. of the tetramethyl ether of tetramethylol-hydrazo-dicarboxylic acid diamide, 5 g. of an iron oxide pigment or carbon black, 2.5 g. of the sodium salt of dibutylnaphthalene sulfonic acid and 3 g. of ammonium sulfate. Thereupon the fabric is dried and heated to 130° C. for 5 minutes.

The antistatic finish and the pigment are fixed fast to washing. Besides, the fabric is given by this treatment a stiff and full handle which is retained even on washing several times.

We claim:

1. A process for treating textile materials which consists of impregnating the textile materials with a solution of (a) a condensate of a member selected from the group consisting of an aromatic amine and a phenolic compound with at least two units of a polyalkylene glycol ether, and (b) a member of the group consisting of formaldehyde, a compound splitting off formaldehyde on heating, a compound containing at least two free active methylol groups and a compound containing at least two active methylol groups etherified by a low molecular weight aliphatic alcohol, and heating the impregnated textile materials.

2. A textile material treated by the process of claim 1.

References Cited in the file of this patent

UNITED STATES PATENTS

| | | |
|---|---|---|
| 2,313,742 | Engelmann et al. | Mar. 16, 1943 |
| 2,518,245 | Morris et al. | Aug. 8, 1950 |
| 2,689,844 | Melamed | Sept. 21, 1954 |
| 2,878,294 | Kress | Mar. 17, 1959 |